United States Patent
Kao et al.

(10) Patent No.: US 11,747,994 B2
(45) Date of Patent: Sep. 5, 2023

(54) POWER LOSS PROTECTION OF DATA IN MEMORY DEVICES

(71) Applicant: Micron Technology, Inc., Boise, ID (US)

(72) Inventors: Chih-Kuo Kao, Fremont, CA (US); Yi-Min Lin, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 52 days.

(21) Appl. No.: 17/462,335

(22) Filed: Aug. 31, 2021

(65) Prior Publication Data

US 2023/0073518 A1 Mar. 9, 2023

(51) Int. Cl.
*G06F 3/06* (2006.01)
*G06F 11/30* (2006.01)
*G06F 1/30* (2006.01)

(52) U.S. Cl.
CPC .............. *G06F 3/0619* (2013.01); *G06F 1/30* (2013.01); *G06F 3/0632* (2013.01); *G06F 3/0653* (2013.01); *G06F 3/0659* (2013.01); *G06F 3/0679* (2013.01); *G06F 11/3037* (2013.01)

(58) Field of Classification Search
CPC .... G06F 3/0619; G06F 3/0632; G06F 3/0653; G06F 3/0659; G06F 3/0679; G06F 1/30; G06F 11/3037
See application file for complete search history.

(56) References Cited

U.S. PATENT DOCUMENTS

| | | | |
|---|---|---|---|
| 2006/0136758 A1* | 6/2006 | Yoon ..................... | G11C 5/147 713/300 |
| 2007/0106918 A1* | 5/2007 | Oyanagi .................. | G06F 1/30 713/300 |
| 2012/0311407 A1 | 12/2012 | Lee et al. | |
| 2014/0229767 A1 | 8/2014 | Kang et al. | |
| 2016/0335009 A1* | 11/2016 | Vijayan ............... | G06F 11/1469 |
| 2017/0040051 A1* | 2/2017 | Edirisooriya ..... | G11C 11/40615 |
| 2018/0284995 A1* | 10/2018 | Dantkale ............. | G06F 12/0868 |

(Continued)

FOREIGN PATENT DOCUMENTS

KR 10-1772020 B1 8/2017

OTHER PUBLICATIONS

PCT Notification of Transmittal of the International Search Report and the Written Opinion of the International Searching Authority for PCT Application No. PCT/US2022/042254, dated Dec. 23, 2022, 9 pages.

*Primary Examiner* — Nanci N Wong
(74) *Attorney, Agent, or Firm* — LOWENSTEIN SANDLER LLP (57) ABSTRACT

A system can include multiple memory devices and a processing device that is operatively coupled with the memory devices as well as with a controller device, and a sequencer device, where the controller device is configured to perform operations. The operations can include, in response to receiving a potential power loss indication signal, receiving a power fault interrupt detection signal, as well as synchronizing the power fault interrupt detection signal. They can also include sending one or more memory access commands to the sequencer device. The operations can also include executing the one or more memory access commands on a medium and stopping transmission of commands based on a power loss handling setting while executing the commands.

20 Claims, 6 Drawing Sheets

(56) References Cited

U.S. PATENT DOCUMENTS

| | | | |
|---|---|---|---|
| 2020/0004636 A1* | 1/2020 | Secatch | G06F 12/0246 |
| 2020/0242021 A1 | 7/2020 | Gholamipour et al. | |
| 2021/0165586 A1 | 6/2021 | Rowley | |
| 2021/0200670 A1 | 7/2021 | Winterfeld et al. | |

* cited by examiner

POWER LOSS PROTECTION OF DATA IN MEMORY DEVICES

TECHNICAL FIELD

Embodiments of the disclosure relate generally to memory sub-systems, and more specifically, relate to power loss protection of data in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to power loss protection of data in memory devices. A memory sub-system can be a storage device, a memory module, or a combination of a storage device and memory module. Examples of storage devices and memory modules are described below in conjunction with FIG. 1 and FIG. 2. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

In some systems that utilize memory devices, there can be a delay between the time that data is sent to be stored and the time that the data actually gets recorded on the medium of the memory device. Similarly, there can be a delay between the time that data is requested to be retrieved from the memory device and the time it is actually received by the requesting component. This often occurs due to the data having to pass through other components of the system before arriving at its destination and due to the latency of the read and write operations being executed on the medium of the memory device.

As a result of this delay, it is possible that a system or a memory device in a system may experience a power loss event, such as an asynchronous power loss (APL) while there is still data, that was either requested or transmitted, still making its way through the other components of the system or pending in a component to be written or retrieved when the power loss occurs. Conventional approaches simply deemed this so-called "in flight" data to be lost, in many cases, irretrievably. This reasoning may have been predicated on the memory device being a volatile memory device and inevitably losing the data when the power was lost since volatile memory devices depend on power being maintained to be able to retain data. However, memory devices that include non-volatile media allow for the possibility of in-flight data being saved before power is completely lost in a computing system.

Some systems with non-volatile media devices can include capacitors that can provide power to the components of the system when the primary source of power is lost or when a power loss event is otherwise experienced (e.g., during an APL). However, capacitor size and energy storage capacity is very limited in many cases. Moreover, the power provided by a capacitor can often be needed to be distributed and shared among many components to provide power for their operation when such a power loss event occurs.

Because the capacitors often have very limited power-sustaining time, some components of the system and some of their respective operations may need to be prioritized during a power loss event to use the available power-sustaining efficiently.

Notably, if a power loss event occurs while there is critical system data or metadata in-flight and it is not saved in a non-volatile medium or securely retrieved by another component before complete power loss, it can be lost. The loss of such critical data or metadata can lead to loss of integrity for already recorded data, data corruption, increased latency, and performance degradation in various types of non-volatile memory devices.

Aspects of the present disclosure address the aforementioned and other deficiencies by having a memory sub-system that can implement power loss handling and power loss protection (PLP) schemes that can provide an ample amount of energy to the various components of the sub-system and ensure that data (e.g., system data or metadata) that is in flight is written to the media when a power loss event occurs. Embodiments of the present disclosure can include elements that can detect that a power loss event is occurring and initiate a sequence of operations that ensures that the performance of commands for reading and writing data that have not yet been executed is completed and that the data is secured before power is completely lost.

Some embodiments can have processors, controllers, and sequencers that can each receive indications (e.g., signals) from other circuit components that a power loss event is occurring or imminent. Then, depending on the settings of the embodiment (i.e., firmware settings of the memory sub-system) the controller and sequencer can alter their operation in response to a signal relating to the loss of power. For example, the systems of some embodiments can stop data traffic (e.g., the transmission of read/write commands and corresponding data sets) between the controller and either the host or the processor as well as data traffic between the controller and the sequencer. Accordingly, the system can prevent further read/write commands and data being issued to the controller and prevent the controller from transmitting read/write commands and data to the sequencer, thereby reducing power consumption. The reduced power consumption allows the capacitor's limited supply of power to be provided to other components and their respective operations. For example, in the duration of time while data traffic (e.g., transmission of commands) is stopped, the sequencer can complete the execution of pending commands that were pending when the potential power loss indication was received. In some cases, the system can have the sequencer execute the commands concurrently in accordance with concurrency-table settings to further optimize the use of the limited supply of power depending on system requirements.

Advantages of the present disclosure include but are not limited to reducing the energy drain of some memory sub-system components during a power loss event and ensuring that important data is not lost before power is completely lost. Embodiments of the present disclosure can extend the operative time of a controller and sequencer of a memory system after the commencement of a power loss event. Some embodiments can also secure in flight data that would otherwise be lost and maintain the integrity of data stored on the memory device of the system that would otherwise become corrupted. Accordingly, the various embodiments of the present disclosure improve the efficiency and reliability of memory devices and related systems.

Figure 1:
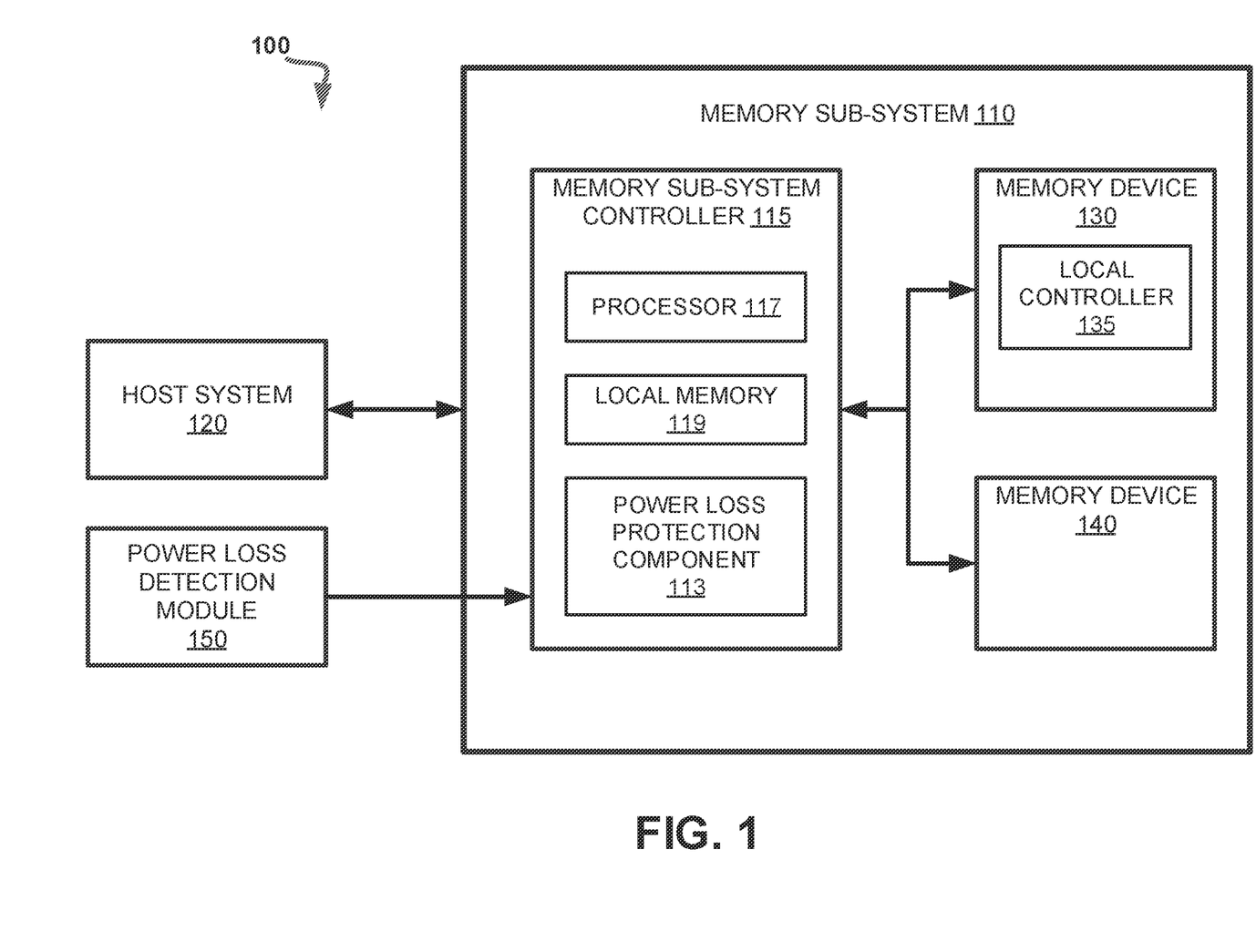
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130. The computing system 100 can also include a power loss detection module 150 that can be a component of the memory sub-system 110 or be a discrete component of computing system 100 that is communicatively coupled to other components of the memory sub-system 110 or to the host system 120. The power loss detection module 150 can include a device or circuitry configured to detect voltage levels passing through it and other components of the computing system 100. In some embodiment, the power loss detection module can detect increases and decreases in voltage and generate signals that indicate voltage level values or indicate that a voltage satisfies a threshold criterion. For example, the power loss detection module 150 can detect a drop in voltage below a predetermined threshold that is indicative of a power loss event and generate a signal to be transmitted to other components of computing system 100. The power loss detection module 150 can send an indication of a potential power loss (e.g., a Power Fault Interrupt signal) to host system 120, controllers 115, 135, memory devices 130, 140 and their constituent components.

Figure 2:
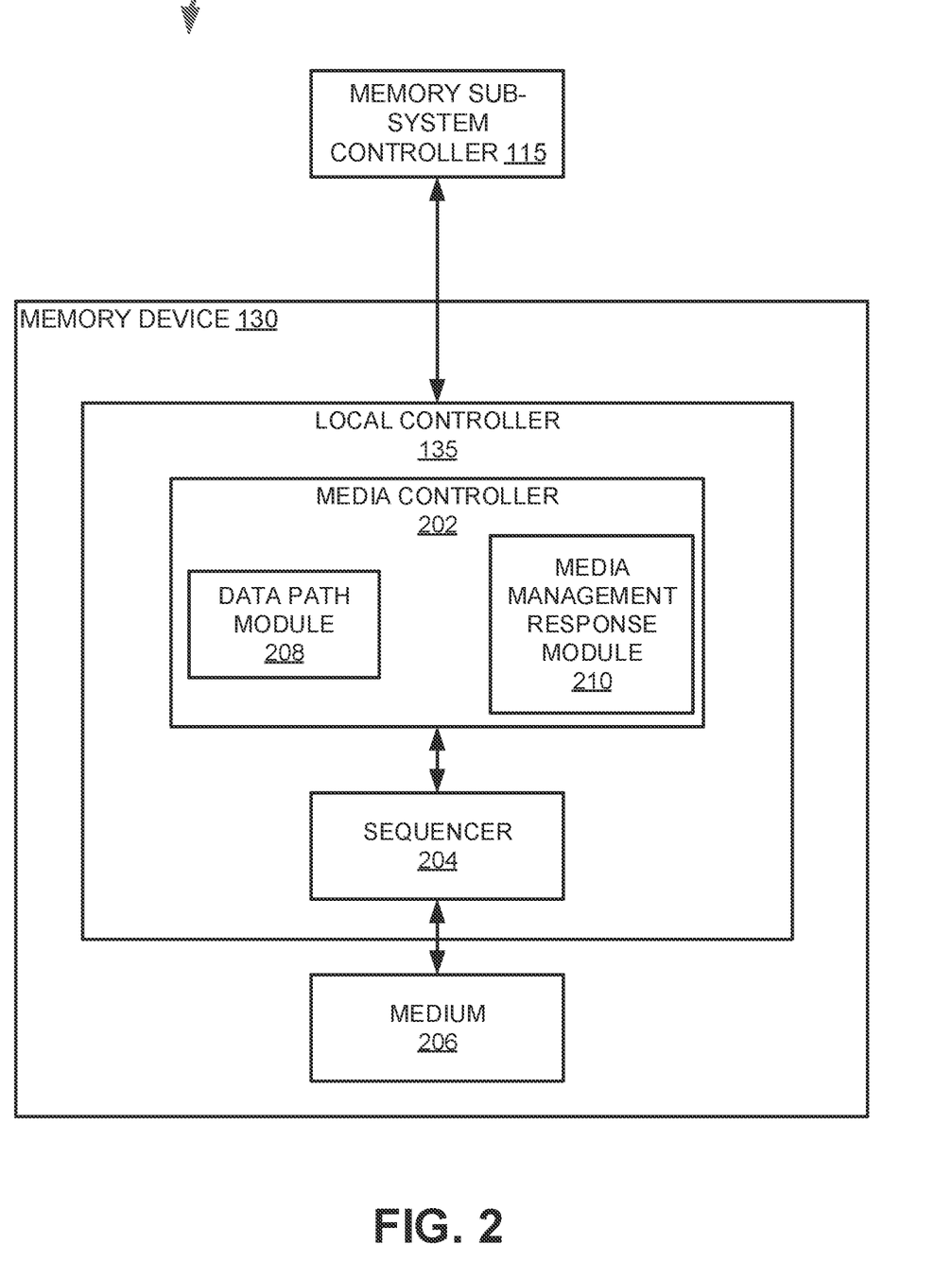
FIG. 2 illustrates an example memory sub-system in accordance with some embodiments of the present disclosure.

A more detailed depiction of an embodiment of the present disclosure that is shown in FIG. 2 includes an example memory sub-system 200 and can be understood with continued reference to FIG. 1. In some embodiments, the memory devices 130 include local controllers 135 that operate in conjunction with memory sub-system controllers 115 to execute operations on one or more memory cells of the memory devices 130. The local controller 135 can be a component of the memory device 130 or can be a discrete component of the memory sub-system 110 that is communicatively coupled to memory sub-system controller 115 and memory device 130. In some embodiments, the local controller 135 includes a media controller 202 and a sequencer 204 that operate in conjunction to execute commands and transfer data between the medium 206 of the memory device 130 and other components of the computing system 100. For example, the media controller 202 and the sequencer 204 operating as components of local controller 135 can perform read and write operations and transmit commands (e.g., memory access commands) between the memory sub-system controller 115 and the medium 206 of the memory device 130.

In some embodiments, the local controller 135 or the media controller 202 can manage the movement of data to and from the memory device 130. The sequencer 204 can receive commands (e.g., read/write commands) from the media controller 202 and hold them in a queue to be executed on the medium 206. The local controller 135, the media controller 202, and the sequencer 204, can each receive settings and signals from other components of memory sub-system 110 such as and memory sub-system controller 115 and change parameters of the execution of the commands, that have been received or are pending, in accordance with those settings and signal. For example, the media controller 202 and the sequencer 204 can receive a signal indicative of a potential power loss event from the memory sub-system controller 115. In response to receiving this signal, the media controller 202 and the sequencer 204 stop data traffic or commands from being transmitted between the memory sub-system controller 115 and the media controller 202 and from being transmitted between media controller 202 and sequencer 204.

In some embodiments, the local controller 135 or the sequencer 204 can manage the concurrent performance of commands on the memory device 130 in accordance with a concurrency table that can be pre-set or sent by the memory sub-system controller 115. The sequencer 204 can also receive data from and transmit data to a data path module 208 and a media management response module 210, each of which can form components of media controller 202 or be discrete components of memory sub-system 110. Data that is transmitted between the sequencer 204 and each of data path module 208 and media management response module 210 can include data about the status of commands and the status of the data sets that were sent to or pending at the sequencer (e.g., data indicating completion/execution of a command or indicating transmission of information to the medium 206). For example, media management response module 210 can track or monitor commands sent to the sequencer 204 and send a signal when a threshold criterion (e.g., a number of operations being completed) is satisfied or when an indication of the completion of all pending operations is received from the sequencer 204. The data path module 208 can collect data that was read from medium 206 so that it can be fetched by other components of memory sub-system 110 (e.g., transmitted to the memory sub-system controller 115).

In some embodiments, an external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 135) on the die and a controller (e.g., memory sub-system controller 115) for media management within the same memory device package. An example of a managed memory device is a managed NAND (MNAND) device.

In other embodiments, the memory sub-system 110 includes a power loss protection component 113 that can detect a potential power loss event and modify the execution of commands and the transfer of data in the memory sub system 110 to ensure the integrity of the data saved on memory device 130 and prevent the loss of critical system data and metadata. By altering the data traffic flow in the memory sub-system 110 as well as the speed and order of the execution of commands on the memory device 130, the power loss protection component 113 can prioritize pending commands together with in flight data to be saved before a complete loss of power occurs. In some embodiments, the power loss protection component 113 forms at least a portion of one or more components including the power loss detection module 150, the memory device 130, the local controller 135, the media controller 202, and the sequencer 204. In other embodiments, the power loss protection component 113 includes at least a portion of one or more components including the power loss detection module 150, the memory device 130, the local controller 135, the media controller 202, and the sequencer 204. In some embodiments, the memory sub-system controller 115 includes at least a portion of the power loss protection component 113 and is communicatively coupled to the other components of the memory sub-system 110 and computing device 100. In some embodiments, the power loss protection component 113 is part of the host system 110, an application, or an operating system. In other embodiments, local controller 135 includes at least a portion of power loss protection component 113 and is configured to perform the functionality described herein.

The power loss protection component 113 can detect a voltage or a change in voltage satisfying a threshold criterion (e.g., falling below or rising above a predetermined value). For example, it can detect a voltage that is significantly less than (e.g., 0 volts) or is a fraction of the average operating voltage of a component of computing device 100. In some embodiments it can detect a rapid change in voltage over a short period of time. In response to detecting a measurement that satisfies the threshold criterion, the power loss protection component 113 can transmit a signal indicating that a power loss event is occurring or is imminent. This signal, referred to herein as a potential power loss indication signal, can be sent to other components of memory sub-system 110 to trigger a change in the performance of operations and the transmission of data between them. This change can be triggered by the power loss protection component 113 generating and transmitting a power fault interrupt detection signal to other components of the memory sub-system 110. In some embodiments, the power fault interrupt detection signal can be synchronized with the clock of one of the components of memory sub system 110 (e.g., a clock of power loss protection component 113, of memory sub-system controller 115, or of media controller 202).

Upon the transmission or the receipt of the power fault interrupt detection signal, the power loss protection component 113 can modify the ongoing execution of operations on the memory sub-system 110 in several ways. In some embodiments, it can complete pending read/write operations that have not yet been completed by respectively writing data to and reading data from the memory device 130 (e.g., particular areas of medium 206 on the memory device 130) while reducing energy consumption by stopping the flow of data traffic (i.e., the transmission of commands) between components of the computing system 100 or memory sub-system 110 based on a setting of the memory sub-system 110 or based on a received signal. For example, it can stop the transmission of data and commands being sent to the power loss protection component 113. It can also stop the transmission of data and commands to a component (e.g., sequencer 204) configured to manage the execution of operations according to a sequencing or concurrency scheme performed on the medium 206 of the memory device 130. The power loss protection component 113 can stop these data and command transmissions simultaneously with (or during time periods at least partially overlapping with) the completion of the pending commands and the recording of in flight data on the memory device 130 or another component of memory sub-system 110.

In some embodiments of the present disclosure, power loss protection component 113 can select a concurrency table based on a predetermined setting of the memory sub-system controller 115 or based on a signal generated in response to or indicating the detection of the potential power loss event. The concurrency table can regulate the concurrent execution of commands in a component of the memory sub-system 110. For example, the concurrency table can be used to change the number of concurrent operations which are to be performed by the power loss protection component 113 on the memory device 130. In other cases, the concurrency table can be sent to a sequencing device which can speed up or slow down the execution of read/write commands on the medium 206 of the memory device 130 by respectively increasing or decreasing the number of concurrent operations that are performed by the sequencing device (e.g., sequencer 204). The power loss protection component 113 can also monitor the performance of pending commands and generate a signal to be sent to other components of memory sub-system 110 that indicates the completion of commands when their corresponding data is sent to or retrieved from the medium 206 of the memory device 130. In response to this completion indication signal, a completion trigger, which can also be in the form of a signal, can be transmitted by the power loss protection component 113 or by processor 117 to other components of memory sub-system 110. The completion trigger can indicate that the other components (e.g., memory sub-system controller 115) can proceed with other operations that may have been paused or that the other components can proceed with communicating with host system 120. In this manner, the power loss protection component 113, can limit energy consumption by stopping data traffic between the various components of memory sub-system 110. At the same time, it can also prevent data loss by prioritizing the critical system data and metadata to be written to memory device 130 and prioritizing the completion of the commands pending in the components during a power loss event.

In other embodiments, the power loss protection component 113 can perform power loss handling functions similar to those described above without detecting a voltage or a change in voltage that satisfies a threshold criterion. The power loss protection component 113 can register a power loss handling instruction and initiate the power loss handling scheme based on a predetermined setting of the memory sub-system 110 or the memory sub-system controller 115.

Additionally, the power loss protection component 113 can select a concurrency table that can determine the number of commands that can concurrently be executed at particular locations on the medium 206 of the memory device 130. The selection of the concurrency table can depend on a setting of the memory sub-system 110 or the memory sub-system controller 115. In some embodiments, the power loss protection component 113 can send the concurrency table to another component of the memory sub-system 110 and, in conjunction with the other component, execute any pending commands in particular areas of the medium 206 of the memory device 130 in accordance with the concurrency table.

While executing the pending commands, the power loss protection component 113 can also interrupt or stop data and command transmissions between components of the memory sub-system 110. For example, the power loss protection component 113 can stop communication (i.e., data and command traffic) between a processing component (e.g., processor 117) and a controller component (e.g. local controller 135) as well as between the controller component and a sequencing component (e.g., sequencer 204). The components between which communication is stopped by power loss protection component 113 can be determined by a setting of memory sub-system 110 or the memory sub-system controller 115.

The power loss protection component 113 can also monitor or track the pending commands and send a completion indication to another component of the memory sub-system 110 when the command is completed. In response to the transmission of the completion indication, the power loss protection component 113 or another component of the memory sub-system 110 can generate and transmit a completion trigger signal to a processing device (e.g., processor 117) or the host system 120. The completion trigger can indicate that communication between components of the memory sub-system 110 or between the memory sub-system 110 and the host system 120 can resume. In this manner, the power loss protection component 113, can throttle power consumption by stopping the transmission of commands between the various components of memory sub-system 110 and also prevent data loss by prioritizing the completion commands pending in the components of the memory sub-system 110 and the transfer of critical system data and metadata to be written on memory device 130.

In other embodiments, the functions described herein can be performed by other components. For example, a power loss detection module 150 can detect a voltage or a voltage change that satisfies a threshold criterion (e.g., falling below or rising above a predetermined value). For example, it can detect a voltage that is significantly lower than (e.g., 0 volts or 1 volt) than or is a fraction of the average operating voltage of a component of computing device 100, or it can detect a rapid change in voltage over a short period of time (e.g., more than 1 volt per millisecond). In response to the voltage or the voltage change that satisfies the threshold criterion being detected, the power loss detection module can send a potential power loss indication signal to the processor 117 in memory sub-controller 115. This signal indicating a potential power loss can be referred to as a Power Fault Interrupt (PFI) signal.

In some embodiments, after receiving the potential power loss indication signal, the processor 117 can respond by generating and transmitting a power fault interrupt detection signal that indicates that a PFI has been detected to the media controller 202 and to the sequencer 204. By doing so, the processor 117 can thereby trigger the initiation of a power loss handling scheme (e.g., a PLP scheme). In some cases, the power fault interrupt detection signal transmitted by the processor 117 can be synchronized using a double-flop synchronizer with the clock of the media controller 202 if the power fault interrupt detection signal is out of sync with the media controller 202.

At the time that the media controller 202 and the sequencer 204 receive the power fault interrupt detection signal, each of them may have commands and data pending to be transmitted. This may include memory access commands for read operations and write operations to respectively retrieve data from or record data on the medium 206 of the memory device 130. When the media controller 202 receives the power fault interrupt detection signal it can stop the data traffic (i.e., transmission of data and commands) along pathways (i.e., at communication channels between components) that are determined by the settings of the memory sub-system controller 115. For example, the media controller 202 can stop data traffic between the memory sub-system controller 115 and the local controller 135. Similarly, the media controller 202 can stop the data traffic between the memory sub-system controller 115 and the media controller 202. Additionally, the media controller 202 can also stop the data traffic between the media controller 202 and the sequencer 204. Accordingly, in some cases, the media controller 202 can stop the data traffic both (i) between the memory sub-system controller 115 and the media controller 202 and (ii) between the media controller 202 and the sequencer 204. Each of these options can be selected based on a changeable power loss handling setting of the memory sub-system controller 115 that can be transmitted to each of the media controller 202 and the sequencer 204. Notably, there can be a setting based on which the media controller 202 does not stop data traffic and continues normal operation upon receipt of the power fault interrupt detection signal.

Contemporaneously with the media controller 202 stopping data traffic, and in response to receiving the power fault interrupt detection signal, the sequencer 204 can execute read/write commands that were pending in a queue at the sequencer 204 or the media controller 202 along with their corresponding data sates waiting to be retrieved from or written to the memory device 130. The execution of the memory access commands (e.g., read/write commands) on the medium 206 of the memory device 130 by the sequencer 204 can be performed in accordance with a concurrency table that indicates how many commands should be executed concurrently. The concurrency table can be selected based on a concurrency setting of the memory sub-system controller 115 and based on the operative state of the media controller (e.g., normal, idle, or power fault interrupt). It can then be sent by the processor 117 to the sequencer 204. Similarly, the determination of whether the sequencer alters its operation by switching concurrency tables to execute a different number of concurrent operations or whether it continues normal operation upon receipt of the power fault interrupt detection signal, can depend on a power loss handling setting of the memory sub-system controller 115.

Furthermore, as the sequencer 204 is performing the read and write operations, a media management response module 210 that forms a part of media controller 202 can monitor the execution of the commands and track completion of the operations. When a predetermined threshold criterion is satisfied by the sequencer 204 (e.g., when a particular number of operations are completed or when all the write operations are completed), the media management response module 210 can receive a completion indication from a sequencer 204. In response to receiving the completion indication, the media management response module 210 can transmit a completion trigger to the processor 117 that forms a part of the memory sub-system controller 115. This completion indication can indicate that communication between the various components of the memory sub-system 110 or between the memory sub-system 110 and the host system 120 that was suspended can resume, or it can trigger the resumption of such communication. In some embodiments, as the sequencer 204 performs read operations, data path module 208 in media controller 202 can collect data that was read from the medium 206 of the memory device 130 before it is transmitted to the memory sub-system controller 115.

In some embodiments, the memory sub-system controller 115 can receive or register power loss handling instructions and initiate a power loss handling procedure without receiving a PFI signal. For example, the memory sub-system controller 115 can transmit instructions to the local controller 135 or to the media controller 202 and to the sequencer 204 to perform a procedure that is analogous to the one performed by the various components of memory sub-system 110. This power loss handling procedure can include all of the functions and operations performed by the components of memory sub-system 110 after the receipt of the power fault interrupt detection signal by the media controller 202 and by the sequencer 204 as described above.

Memory access commands such as read commands and write commands can be transmitted by the memory sub-system controller 115 to the media controller 202 as well as by the media controller 202 to the sequencer 204 for execution on a particular area of the medium 206 of the memory device 130. In some embodiments, the processor 117 can select a concurrency table that indicates the number of commands that are to be concurrently executed based on a setting that depends on the status of the media controller (e.g., normal, idle, power fault interrupt) as well as on a changeable setting of the memory sub-system controller 115. The processor 117 can send the selected concurrency table to the sequencer 204 that can, in turn, execute the pending commands on the memory device 130 according to the concurrency table.

In other embodiments when a supply voltage yin provided by host system 120 falls below a predetermined value, the power loss detection module 150 can generate a PFI signal and send it through a general input/output pin to the processor 117 of the memory sub-system controller 115. In response to receiving the PFI signal, the memory sub-system controller 115 can generate and transmit a PFI detection signal to both the media controller 202 and the sequencer 204. The PFI detection signal can serve as an indication of a potential power loss condition and can initiate power loss handling procedures. In some cases, the PFI detection signal sent from the memory sub-system controller 115 can be out of sync with the media controller. In these situations, the PFI detection signal can be synchronized from the clock domain of the memory sub-system controller 115 to the clock domain of the media controller 202.

In some embodiments, the power loss handling procedures can be initiated by the memory sub-system controller 115 without receiving a PFI signal and without sending a PFI detection signal. Instead, based on programmable settings, the memory sub-system controller 115 can transmit instructions to the media controller 202 and to the sequencer 204 for modifying their operations in accordance with a power loss handling scheme. Accordingly, the power loss handling procedures can be initiated in two situations. One situation is when the power fault interrupt programmable setting is enabled and a PFI signal is detected by the memory sub-system controller 115. The other situation is when the memory sub-system controller 115 asynchronous power loss handling setting is enabled regardless of whether a PFI signal is sent or detected. In the latter situation, the memory sub-system controller 115 can generate and transmit a Power Fault Interrupt Active (PFI Active) signal based on the enabled asynchronous power loss handling setting to initiate the power loss handling procedure.

After the initiation of the power loss handling procedure, commands that were pending in the media controller 202 and the sequencer 204 at the time of the initiation can be executed on the media device 130. In some embodiments, the media management response module 210 in the media controller 202 can track current commands being issued from the media controller 202 to the sequencer 204. When the media management response module 210 receives an indication from the sequencer 204 that all the commands (e.g., write commands transmitting data to the medium 206) have been completed, it can trigger an interrupt (i.e., transmit a signal indicating the completion of the execution of the commands by the sequencer) that informs the memory sub-system controller 115 that it can proceed with other operations in the sequence of the power loss handling scheme. Similarly, the data that was retrieved by the read commands executed by the sequencer 204 can be collected by the data path module 208 in the media controller 202 before being transmitted to the memory sub-system controller 115.

When the power loss handling procedure is activated, the media controller 202 can modify its operation and stop data traffic at different components of the computing system 100. The behavior of the media controller 202 can depend on whether power loss handling procedure is activated (e.g., due to the detection of a PFI signal by the memory sub-system controller 115 or due to initiation by memory sub-system controller 115 based on a power loss handling setting) and the power loss handling option setting selected at the memory sub-system controller 115. The following table describes the behavior of the media controller 202 in various situations.

TABLE 1

| MEDIA CONTROLLER BEHAVIOR | POWER LOSS HANDLING PROCEDURE | POWER LOSS HANDLING OPTION SELECTED |
| --- | --- | --- |
| Normal operation | Not Activated | Any |
| | Activated | Option 1 |
| Stop data traffic between media controller and memory sub-system controller | Activated | Option 2 |
| Stop data traffic between media controller and sequencer | Activated | Option 3 |

TABLE 1-continued

| MEDIA CONTROLLER BEHAVIOR | POWER LOSS HANDLING PROCEDURE | POWER LOSS HANDLING OPTION SELECTED |
| --- | --- | --- |
| Stop data traffic both (i) between media controller and memory sub-system controller and (ii) between media controller and sequencer | Activated | Option 4 |

As can be seen in Table 1, the media controller 202 can continue normal operation regardless of the power loss handling option setting selected if (i) the power loss handling procedure is not activated or if (ii) option 1 is selected and the power loss handling procedure is activated. Further, if the power loss handling procedure is activated, the media controller 202 can stop data traffic between media controller 202 and memory sub-system controller 115 if option 2 is selected, and can stop traffic between media controller 202 and sequencer 204 if option 3 is selected. If the power loss handling procedure is activated and option 4 is selected, the media controller 202 can stop data traffic both (i) between media controller 202 and memory sub-system controller 115, and (ii) between media controller 202 and sequencer 204.

In some embodiments, the sequencer 204 can receive a signal instructing it to alter its operation according to a power loss handling scheme (e.g., a PFI Active signal) at the same time that the media controller 202 receives the same signal from memory sub-system controller 115. In other embodiments, the sequencer can receive the PFI Active signal from the media controller 202 after the media controller 202 receives it from the memory sub-system controller 115. Similarly to the situation described above, the receipt of this PFI Active signal by the sequencer 204 can occur in response to the detection of a PFI signal by the memory sub-system controller 115 or in response to the initiation of a power loss handling procedure by memory sub-system controller 115 based on a power loss handling setting.

A concurrency table, that is selected by the memory sub-system controller 115 based on concurrency settings and based on the operating status of the media controller 202, can be sent to the sequencer 204 so that the sequencer 204 can switch to a different concurrency table for completing the execution of the pending commands. The sequencer 204 can switch to the concurrency table received from the memory sub-system controller 115 to limit the total number of memory access commands (e.g., read and write commands) issued to be performed concurrently and thereby reduce power use by the components of the memory sub-system 110. The concurrency table that is selected and sent to be used by the sequencer 204 can be determined based on whether the media controller 202 is in a normal, idle, or PFI state and based on a multi-bit programmable setting. Each combination of a state and a setting can be mapped to a particular concurrency table to be used by the sequencer 204. Further details with regards to the power loss handling procedures of the memory sub-system 110 are described below with reference to FIGS. 3-5.

Figure 3:
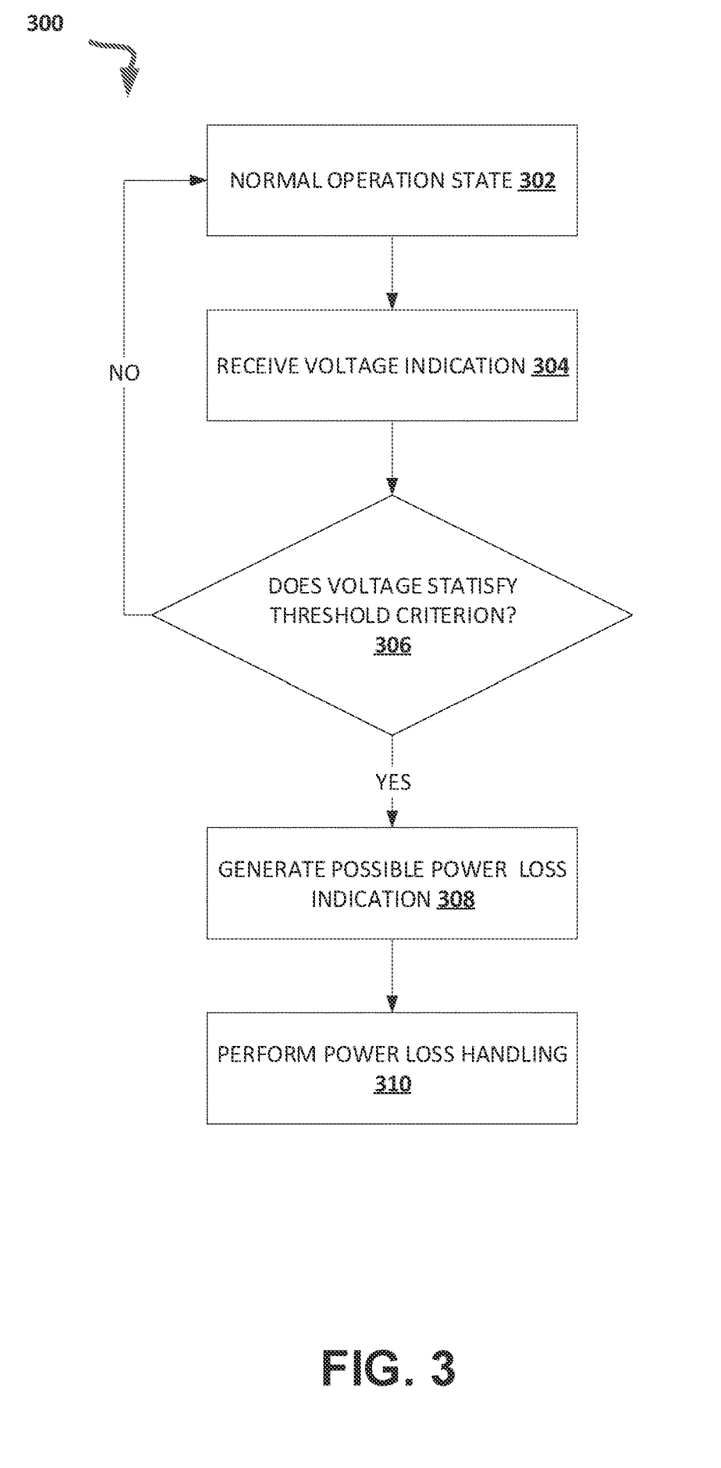
FIG. 3 is a flow diagram of an example method for securing in-flight data in accordance with some embodiments of the present disclosure.

FIG. 3 is a flow diagram of an example method 300 to preserve critical system data and metadata during a potential power loss event, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the power loss protection component 113 of FIG. 1. In other embodiments method 300 is performed by a combination of components of the computing system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing logic can maintain a memory sub-system in a normal operational state as it receives and executes commands to respectively retrieve data from a memory device or write data to a memory device. In the normal operational state commands and data can be received from and sent to components external to the memory sub-system as well as between components of the memory sub system such as controllers and memory devices.

At operation 304, the processing logic can transmit a signal indicating a change in voltage. In some embodiments, a measurement of voltage or a rate of change in voltage can be detected by the processing logic. Subsequently, at operation 306, the processing logic can determine whether the measurement satisfies a predetermined threshold criterion. The threshold criterion can be a satisfied by a value of the measurement falling below or rising above a predetermined threshold value. If the measurement does not satisfy the threshold criterion, the processing logic can return to operation 302 and continue in a normal operational state. However, if the measurement does satisfy the threshold criterion, it may be an indication of the occurrence of a power loss event (e.g., an asynchronous power loss) and further operations can be performed.

Accordingly, at operation 308, the processing logic can generate and transmit a potential power loss indication signal to inform other components of the potential or imminent occurrence of a power loss event. The transmission of the potential power loss indication signal can activate a sequence of subsequent operations to be performed by the processing logic for handling a power loss event. The following sequence of operations can also be initiated by the processing logic transmitting instructions to activate a power loss handling procedure regardless of whether the aforementioned measurement satisfies the threshold criterion. Accordingly, the following operations can alter the normal state operation of the processing logic to lower the usage of power and ensure that critical system data or metadata is saved to a non-volatile memory device before power is completely lost.

Figure 4:
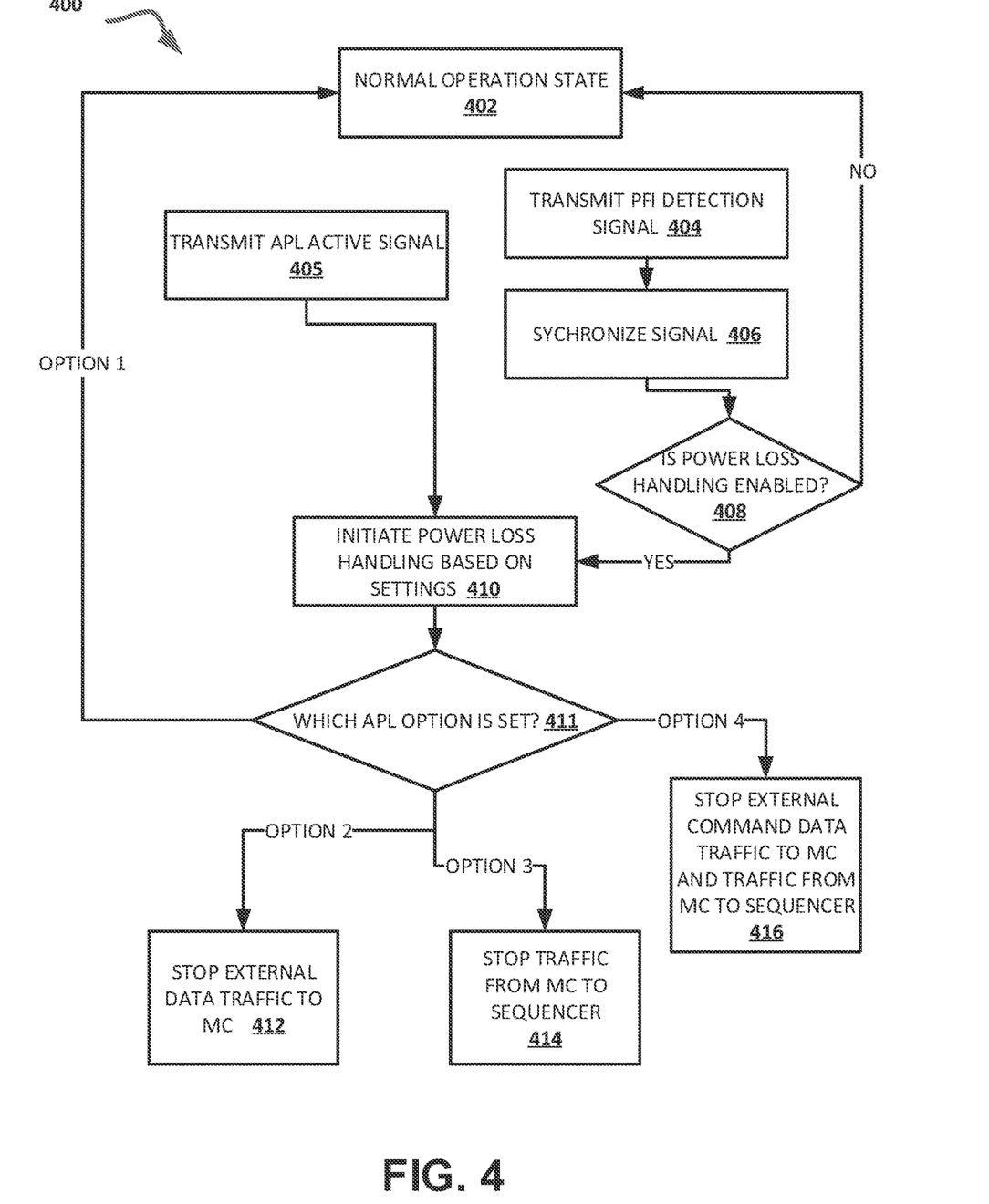
FIG. 4 is a flow diagram of an example method for stopping data traffic during a potential loss of power scenario in accordance with some embodiments of the present disclosure.

FIG. 4 is a flow diagram of an example method 400 to reduce power consumption by stopping data traffic (i.e., transmission of data and commands) in response to an activation of a power loss handling procedure, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the power loss protection component 113 of FIG. 1. In other embodiments, method 400 is performed by a combination of components of the computing system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic can be maintaining a controller of a memory sub-system in a state of normal operation. In the normal operation state the processing logic may transmit commands and data to and from the controller so that they may respectively be executed on and transferred to a memory device (e.g., a non-volatile memory device). In some embodiments, in response to the transmission of the potential power loss indication signal from operation 308, the processing logic can, at operation 404, generate and transmit a power fault interrupt (PFI) detection signal to be received at a component of the memory sub-system 110. However, because in some cases the PFI detection signal may be out of sync with the receiving component, the PFI signal may be synchronized, at operation 406, from a clock domain of one component of the memory sub-system 110 to the clock domain of another component of the memory sub-system 110. At operation 408, the processing logic can determine whether power loss handling is enabled based on a power loss handling setting that can activate or disable the initiation of power loss handling procedures. If the power loss handling is not activated, the processing logic can return to maintaining a normal operation state at operation 402. However, if the power loss handling is activated, the processing logic can initiate further power loss handling operations. In other embodiments, at 405 the processing logic can generate a signal that can initiate power loss handling procedures regardless of whether a PFI detection signal is received.

Accordingly, at operation 410, the processing logic can initiate subsequent operations for power loss handling and transmit a Power Fault Interrupt Active (PFI Active) signal in response to either the transmission of the signal generated at operation 405 or the transmission and synchronization of the signal at operations 404 and 406 respectively. At operation 411, the processing logic can select a power loss handling option based on a power loss handling setting configuration of another component of the memory sub-system 110. In some embodiments, there may be a plurality of settings respectively corresponding to a plurality of options for power loss handling. Some of the power loss handling options can include the cessation of or prevention of communication between components of the computing device 100. If the other component is configured with a setting corresponding to option 1, the processing logic may return to maintaining the controller of a memory sub-system in a state of normal operation at operation 402.

However, if the setting corresponds to another option, the processing logic can proceed to stop data traffic (i.e., communication or transmission of commands and data) between components of the memory sub-system 110. For example, if the power loss handling setting of the other component correspondence leads to option 2 being selected at operation 411, then the processing logic, at operation 412, can stop the data traffic between a memory sub-system controller 115 and a media controller 202. If option 3 is selected at operation 411, then, at operation 414, the processing logic can stop the data traffic between the media controller 202 and the sequencer 204. Lastly, if option 4 is selected at operation 411, the processing logic can, at step 416, stop the data traffic both (i) between media controller 202 and memory sub-system controller 115 and (ii) between media controller 202 and sequencer 204. However, at the same time that power loss handling options are selected and, in some instances, data traffic being stopped, other power loss handling operations can be performed by the processing logic. When a power fault detection signal is transmitted or when a power loss handling initiation signal is transmitted, the processing logic can generate and transmit a PFI Active signal that can trigger the performance of operations relating to commands and data that were pending (i.e., in flight) at the time the PFI Active signal is received.

Figure 5:
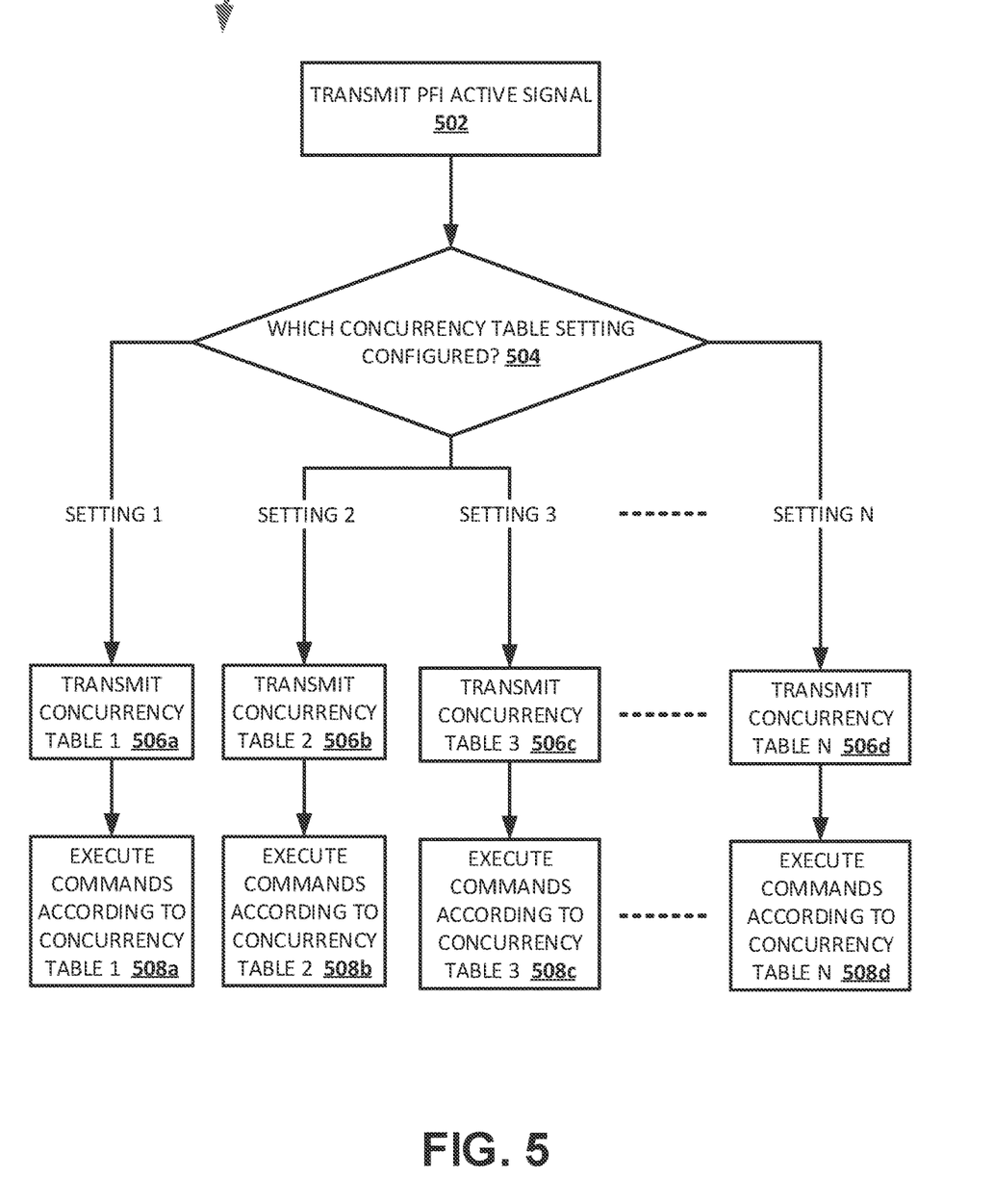
FIG. 5 is a flow diagram of an example method for performing read and write commands during a potential loss of power scenario in accordance with some embodiments of the present disclosure.

FIG. 5 is a flow diagram of an example method 500 completing the execution of commands (e.g., read and write commands) in response to an activation of a power loss handling procedure triggered by a PFI Active signal, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the power loss protection component 113 of FIG. 1. In other embodiments, method 500 is performed by a combination of components of the computing system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic can generate and transmit a PFI Active signal to components of a memory sub-system 110 (e.g., to media controller 202 and sequencer 204). At the time that the PFI Active is transmitted, memory access commands along with their respective data can be pending at each of the media controller 202 and the sequencer 204 for execution on the memory device 130. In some embodiments, the processing logic can determine how many concurrent commands can be executed by a component of the memory sub-system 110 based on a concurrency table selection. Accordingly, at operation 504, the processing logic can determine which concurrency table to use based on a concurrency setting of a component of memory sub-system 110. Each of a set of programmable concurrency settings configured for each potential operation state of a controller of memory sub-system 110 for can be mapped to (i.e., correspond to) a respective set of concurrency tables that can control the number of concurrent commands being executed.

Therefore, if the controller of memory sub-system 110 is configured with setting 1, the processing logic can, at operation 506a, transmit the corresponding concurrency table 1 to regulate concurrent command execution. Then, at operation 508a, the processing logic can use concurrency table 1 to execute commands on (i.e., perform the operations of reading data from and writing data to) the memory device 130 in accordance with its respective concurrency rules. If the controller of memory sub-system 110 is configured with setting 2, the processing logic can, at operation 506b, transmit the corresponding concurrency table 2 to regulate concurrent command execution. Then, at operation 508b, the processing logic can use concurrency table 2 to execute commands on (i.e., perform the operations of reading data from and writing data to) the memory device 130 in accordance with its respective concurrency rules. If the controller of memory sub-system 110 is configured with setting 3, the processing logic can, at operation 506c, transmit the corresponding concurrency table 3 to regulate concurrent command execution. Then, at operation 508c, the processing logic can use concurrency table 3 to execute commands on (i.e., perform the operations of reading data from and writing data to) the memory device 130 in accordance with its respective concurrency rules. This relationship can be generalized for any number N of settings and concurrency tables. Therefore, if the controller of memory sub-system 110 is configured with setting N, the processing logic can, at operation 506d, transmit the corresponding concurrency table N to regulate concurrent command execution. Then, at operation 508d, the processing logic can use concurrency table N to execute commands on (i.e., perform the operations of reading data from and writing data to) the memory device 130 in accordance with its respective concurrency rules. By switching the concurrency tables being used to execute the pending commands, the processing logic can either extend or shorten the amount of time it takes to complete the pending commands. Consequently, the processing logic can thereby vary how much power is consumed during a potential power loss scenario. Analogously, in some embodiments, the processing logic can switch between concurrency tables to alter the concurrent execution of commands in order to meet other system power requirements. These and other methods described herein can be performed by computing device 100 discussed with reference to FIG. 1 above, as well as by other devices and systems described in more detail with reference to FIG. 6.

Figure 6:
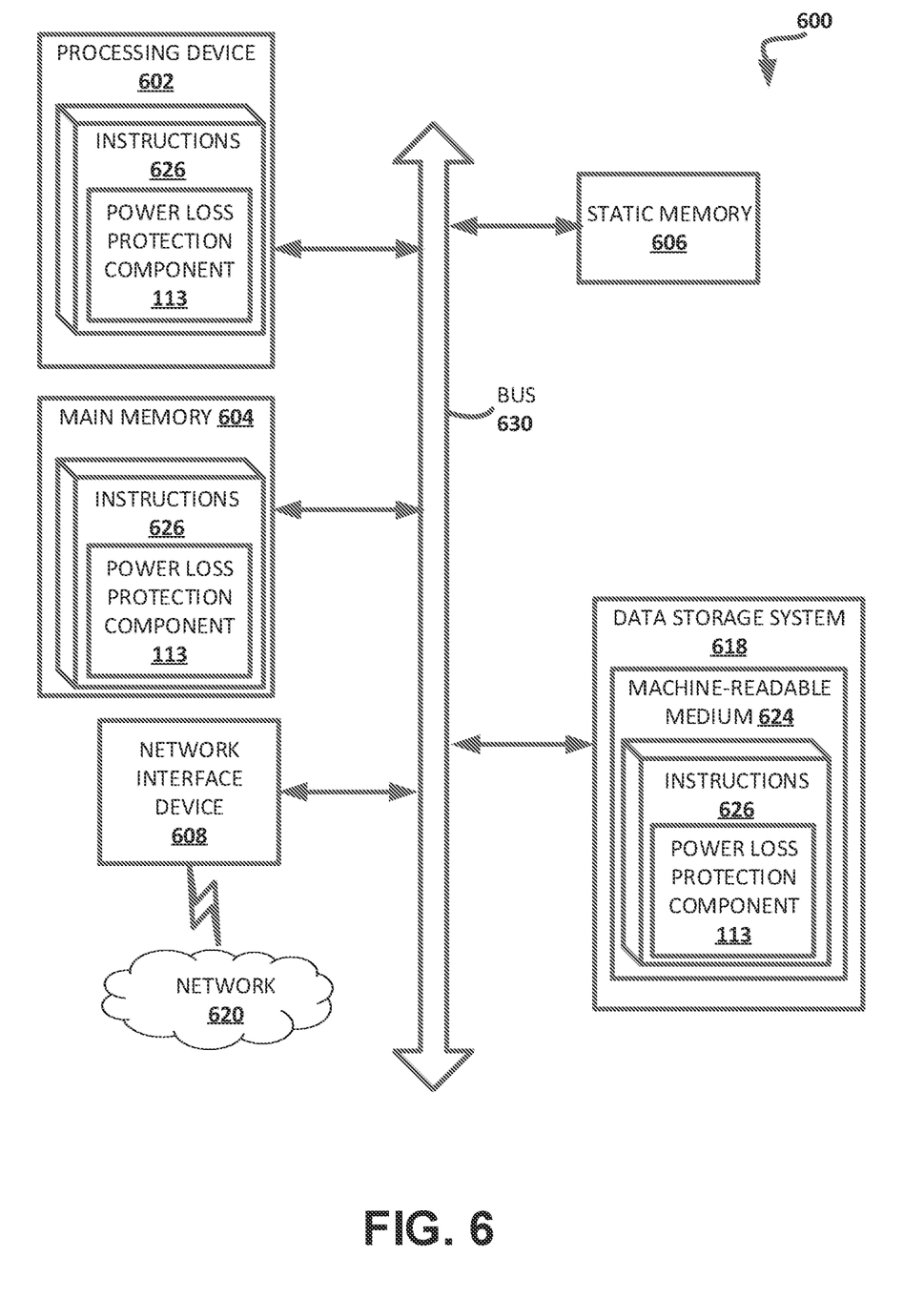
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to memory sub-system controller 115, local controller 135, media controller 202, sequencer 204, or the power loss protection component 113 of FIGS. 1-2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-systems 110, 200 of FIGS. 1-2.

In one embodiment, the instructions 626 include instructions to implement functionality corresponding to all or any of a power loss protection component (e.g., the power loss protection component 113 of FIG. 1) a local controller (e.g., the local controller 135 of FIGS. 1-2), a media controller (e.g., the media controller 202 of FIG. 2), and a sequencer (e.g., the sequencer 204 of FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   responsive to receiving, by a processing device, a potential power loss indication signal, transmitting a power fault interrupt detection signal to a controller device and to a sequencer device;
   executing one or more memory access commands pending at the sequencer device on a medium of a memory device;
   responsive to determining that power loss handling is enabled,
      determining a pair of components between which transmission of commands is to be stopped based on a power loss handling setting; and
      selecting a power loss handling option associated with the pair of components; and
   stopping transmission of commands between the pair of components for a period of time that overlaps with a duration of executing the one or more memory access commands.

2. The method of claim 1, further comprising:
   detecting, by a power loss detection module, a voltage satisfying a threshold criterion; and
   responsive to the voltage satisfying the threshold criterion, transmitting the potential power loss indication signal to the processing device.

3. The method of claim 1, further comprising:
   sending, to the sequencer device, a concurrency table indicating a number of memory access commands to be concurrently executed on the medium of the memory device.

4. The method of claim 1, further comprising:
   monitoring the one or more memory access commands pending at the sequencer device.

5. The method of claim 4, further comprising:
   responsive to the sequencer device completing the one or more memory access commands, sending a completion indication from the sequencer device to the controller device.

6. The method of claim 5, further comprising:
   synchronizing the power fault interrupt detection signal with a clock of the controller device; and
   responsive to receiving the completion indication, sending, by the controller device, a completion trigger to the processing device.

7. The method of claim 1, wherein stopping the transmission of commands between the corresponding pair of components comprises:
   stopping the transmission of commands between the processing device and the controller device, between the controller device and the sequencer device, or both between the processing device and the controller device and between the controller device and the sequencer device.

8. A non-transitory computer-readable storage medium comprising instructions that, when executed by a processing device, cause the processing device to perform operations comprising:
   receiving, by a processing device, a power loss handling instruction;
   sending, to a sequencer device, one or more memory access commands with respect to a memory device;
   selecting a power loss handling option associated with a pair of components between which transmission of commands is to be stopped;
   determining a concurrency table indicating a number of memory access commands to be concurrently executed on a medium of a memory device based on a setting dependent on a status of a controller device;
   sending, to the sequencer device, the concurrency table;
   executing, on a medium of the memory device, according to the concurrency table, the one or more memory access commands pending at the sequencer device; and
   stopping transmission of commands between the corresponding pair of components for a period of time that overlaps with a duration of executing the one or more memory access commands.

9. The non-transitory computer-readable storage medium of claim 8, wherein the operations further comprise:
   monitoring the one or more memory access commands pending at the sequencer device; and
   responsive to the sequencer device completing the one or more memory access commands, sending a completion indication from the sequencer device to the controller device.

10. The non-transitory computer-readable storage medium of claim 9, wherein the operations further comprise:
   responsive to receiving the completion indication, sending, by the controller device, a completion trigger to the processing device.

11. The non-transitory computer-readable storage medium of claim 8, wherein stopping the transmission of commands based on the power loss handling setting comprises:
   stopping the transmission of commands between the processing device and the controller device or between the controller device and the sequencer device.

12. The non-transitory computer-readable storage medium of claim 8, wherein stopping the transmission of commands based on the power loss handling setting comprises:
   stopping the transmission of commands between the processing device and the controller device and between the controller device and the sequencer device.

13. A system comprising:
   a plurality of memory devices; and
   a processing device, operatively coupled with the plurality of memory devices, a controller device, and a sequencer device, wherein the controller device is configured to perform operations comprising:
      receiving a power fault interrupt detection signal;
      sending, to the sequencer device, one or more memory access commands with respect to a memory device of the plurality of memory devices;
      executing the one or more memory access commands pending at the sequencer device;
      responsive to determining that power loss handling is enabled,
         determining a pair of components between which transmission of commands is to be stopped based on a power loss handling setting; and
         selecting a power loss handling option associated with the pair of components; and
      stopping transmission of commands between the pair of components for a period of time that overlaps with a duration of executing the one or more memory access commands.

14. The system of claim 13, wherein the processing device is further operatively coupled with a power loss detection module that is configured to:
- detect a voltage satisfying a threshold criterion; and
- transmit a potential power loss indication signal to the processing device in response to the voltage satisfying the threshold criterion.

15. The system of claim 13, wherein the operations further comprise:
- sending, to the sequencer device, a concurrency table indicating a number of the one or more memory access commands to be concurrently executed on the memory device.

16. The system of claim 13, wherein the operations further comprise:
- monitoring the one or more memory access commands pending at the sequencer device.

17. The system of claim 16, wherein the operations further comprise:
- responsive to the sequencer device completing the one or more memory access commands, sending a completion indication from the sequencer device to the controller device.

18. The system of claim 17, wherein the operations further comprise:
- synchronizing the power fault interrupt detection signal with a clock of the controller device;
- responsive to receiving the completion indication, sending, by the controller device, a completion trigger to the processing device.

19. The system of claim 13, wherein stopping the transmission of commands between the pair of components:
- stopping the transmission of commands between the processing device and the controller device or between the controller device and the sequencer device.

20. The system of claim 13, wherein stopping the transmission of commands between the pair of components:
- stopping the transmission of commands between the processing device and the controller device and between the controller device and the sequencer device.

* * * * *